United States Patent
Dong

(10) Patent No.: US 10,170,928 B2
(45) Date of Patent: Jan. 1, 2019

(54) POWER TRANSFER SYSTEM, POWER SUPPLY SYSTEM AND CHARGING COMBINATION

(71) Applicant: CHERVON INTELLECTUAL PROPERTY LIMITED, Road Town (VG)

(72) Inventor: Aixiang Dong, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 603 days.

(21) Appl. No.: 14/922,908

(22) Filed: Oct. 26, 2015

(65) Prior Publication Data
US 2016/0118826 A1  Apr. 28, 2016

(30) Foreign Application Priority Data
Oct. 28, 2014 (CN) .......................... 2014 1 0589435

(51) Int. Cl.
*H02J 7/00* (2006.01)
*H02J 7/34* (2006.01)

(52) U.S. Cl.
CPC ......... *H02J 7/34* (2013.01); *H02J 2007/0096* (2013.01)

(58) Field of Classification Search
CPC .. H02J 7/34; H02J 7/007; H02J 7/0042; H02J 7/0052; H02J 2007/0096
USPC ................................ 320/107, 112, 114, 160
See application file for complete search history.

(56) References Cited

U.S. PATENT DOCUMENTS

| | | | |
|---|---|---|---|
| 2010/0076615 A1* | 3/2010 | Daniel | F03D 9/00 700/293 |
| 2015/0236522 A1* | 8/2015 | Zhao | H02J 7/007 320/162 |
| 2015/0340890 A1* | 11/2015 | Yao | H02J 7/0042 320/114 |

* cited by examiner

*Primary Examiner* — Edward Tso
*Assistant Examiner* — Aaron Piggush
(74) *Attorney, Agent, or Firm* — Greenberg Traurig, LLP

(57) ABSTRACT

A charging combination includes a power output device which is configured to output electric energy constantly or adjustably and a power input device which is configured to receive electric energy from the power output device. The power output device includes a power supply module for storing electric energy or obtaining electric energy from an external power grid as an energy source, a first USB connector for being connected with the power supply module and at least configured to transfer electric energy, and a first control module having a first controller which is at least configured to control an output voltage of the first USB connector when supplying electric energy. The power input device comprises a second USB connector at least configured to be electrically coupled to the first USB connector for transferring electric energy, and a second control module comprising a second controller at least configured to communicate with the first controller and to control the second USB connector. The first USB connector provides an output voltage which is greater than or equal to 5V.

2 Claims, 3 Drawing Sheets

POWER TRANSFER SYSTEM, POWER SUPPLY SYSTEM AND CHARGING COMBINATION

CLAIM OF PRIORITY

This application claims the benefit of CN 201410589435.4, filed on Oct. 28, 2014, the disclosure of which is incorporated herein by reference in its entirety.

FIELD OF THE DISCLOSURE

The present disclosure relates to a power transfer system, a power supply system and a charging combination.

BACKGROUND OF THE DISCLOSURE

Conventional USB connectors provide a predetermined voltage and have a relatively low output power. With the increased electric power of electrical equipment which are powered or charged by USB ports, the USB promoter group established the USB Power Delivery Specification (USB PD) in July 2012, according to which USB ports can provide electric power with a maximum value equal to 100 W. USB connectors are widely used by customers. There are so many various products with a USB connector, such as mobile phones, chargers, lamps, electric fans, computers, portable hard disks, automobiles, routers, and the like. After establishment of the USB power delivery specification for high-power transfer, the USB connector will play a role in electric tools with electric power below 100 W. Moreover, with the development of electrical intelligence applications and the Internet of Things, electric tools can have a USB connector for supporting high power transfer in accordance with the USB Power Delivery Specification (USB PD) and other characteristics. This will greatly enhance a customer's experience and add to a product's features.

SUMMARY

According to one aspect of the present disclosure, there is provided a charging combination which includes a power output means that is configured to provide electric power constantly or adjustably and a power input means configured to receive electric energy from the power output means. The power output means comprises a power supply module configured to store electric energy or obtain electric energy from an external power grid as an energy source of the power output means and a first USB connector for being electrically coupled to the power supply module and at least configured to transfer electric energy. The power input means comprises a second USB connector at least configured to be electrically coupled to the first USB connector for transferring electric energy and a second control module comprising a second controller at least configured to communicate with the first controller and to control the second USB connector.

Preferably the first USB connector provides an output voltage which is greater than or equal to 5V.

Further, the first controller is preferably electrically coupled to the power supply module and the first USB connector, respectively, and the first USB connector has at least two charging modes, including a precharging mode in which the first USB connector provides an output voltage constantly equal to 5V and an optimum charging mode in which the first USB connector provides an output voltage greater than 5V, and the first controller controls the first USB connector to switch between the precharging mode and the optimum charging mode with the second controller controlling the output voltage of the first USB connector in the optimum charging mode by communicating with the first control module.

Further, the second controller preferably communicates with the first controller by means of the first USB connector and the second connector.

Further, the power output means is preferably a charger or an adaptor and the first control module further comprises a first identification unit for indicating power supply characteristics of the power output means, wherein the power supply characteristics at least includes a maximum output voltage of the first USB connector and the first identification unit is at least configured to communicate with the second control module.

Further, the power input means is preferably an electric equipment or an electric-energy storage device and the second control module further comprises a second identification unit for indicating power input characteristics of the power input means, wherein the power input characteristics includes at least a maximum input voltage of the second USB connector and the second identification unit is at least configured to communicate with the first control module.

According to another aspect of the present disclosure, there is provided a power supply system, comprising an electric tool and an electric equipment which can receive electric energy from the electric tool, wherein the electric tool comprises a power supply module configured to store electric energy or to obtain electric energy from an external power grid as an energy source of the electric tool, a third USB connector for being electrically coupled to the power supply module and at least configured to transfer electric energy, a third control module comprising a third controller which is at least configured to control an output voltage of the third USB connector when supplying electric energy.

Preferably, the electric equipment comprises a fourth USB connector configured to be electrically coupled to the third USB connector for transferring electric energy and a fourth control module comprising a fourth controller at least configured to communicate with the third control module and controlling the fourth USB connector.

Preferably, the third USB connector provides an output voltage greater than or equal to 5V.

Further, the third controller is preferably electrically coupled to the power supply module and the third USB connector, respectively, and the third USB connector has at least two power supply modes including a regular power supply mode in which the third USB connector provides an output voltage constantly equal to 5V and an optimum power supply mode in which the third connector provides an output voltage greater than 5V, wherein the third controller controls the third USB connector to switch between the regular power supply mode and the optimum power supply mode and the fourth controller controls an output voltage of the third USB connector in the optimum power supply mode by communicating with the third control module.

Further, the fourth controller preferably communicates with the third controller by means of the third USB connector and the fourth USB connector.

Further, the third control module preferably comprises a third identification unit for indicating power supply characteristics of the electric tool, wherein the power supply characteristics at least includes a maximum output voltage of the third connector and the third identification unit is at least configured to communicate with the fourth control module.

Further, the fourth control module preferably comprises a fourth identification unit for indicating power input characteristics of the electric equipment, wherein the power input characteristics of the electric equipment includes at least the maximum input voltage of the fourth USB connector and the third controller is at least configured to communicate with the fourth control module.

According to a further aspect of the present disclosure, there is provided a power transfer system which includes the above-mentioned charging combination and the above-mentioned power supply system, wherein the electric equipment is the power input means of the charging combination and receives electric energy from the power output means.

The present disclosure has several advantages. The charging combination according to the present disclosure increases energy transfer efficiency because it allows the power input means to transfer electric energy at a relatively high voltage within a withstanding voltage of the power input means. The power supply system according to the present disclosure allows the electric tool to be an energy source of the electric equipment having a USB connector, and to operate in a regular power supply mode or in an optimum power supply mode suitable for the electric equipment.

BRIEF DESCRIPTION OF THE DRAWINGS

The above and other objects, advantages and features of the present disclosure will become fully understood from the detailed description given hereinbelow in connection with the appended drawings in which.

DETAILED DESCRIPTION

The present disclosure provides a charging combination which transfers electric energy at high electric power through a USB port.

The charging combination according to the present disclosure includes a power output means which provides electric energy in a constant manner or an adjustable manner, and a power input means which receives the electric energy from the power output means. The power output means includes a power module, a first USB connector, a first control module, and a first identification unit. The power input means includes a second USB connector and a second control module. The first control module includes a first controller, and the second control module includes a second controller. It can be understood that the power input means may not have the first identification unit. Instead, the power output means may have a second identification unit which has the same function.

Figure 1:
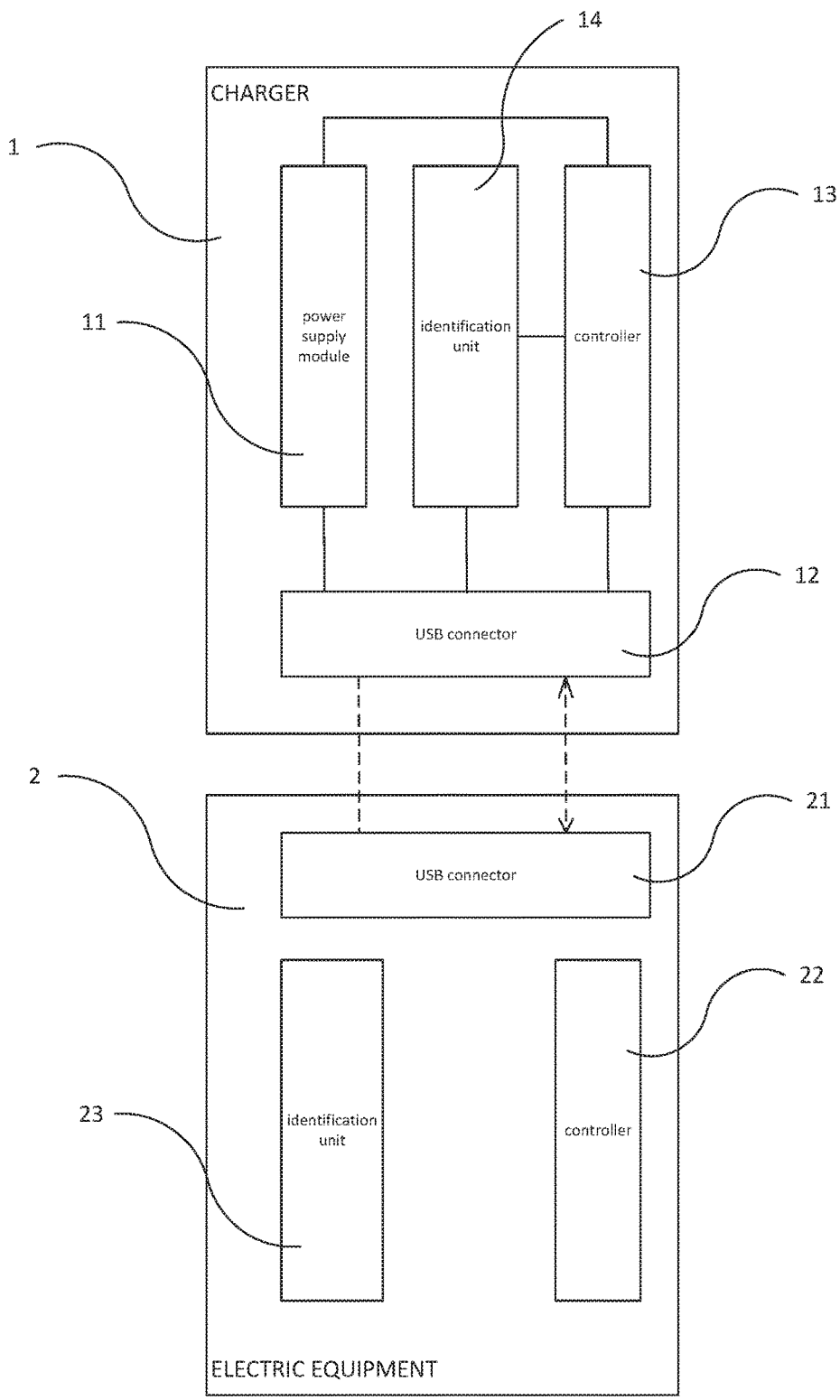
FIG. 1 is a block diagram of an example charging combination according to the description which follows.

FIG. 1 is a block diagram of an example charging combination. Referring to FIG. 1, the power output means of the charging combination according to the present disclosure may be a charger 1, and the power input means 2 may be an electric equipment or an electric-energy storage device, which can be charged by the charger 1. The power supply module, the first USB connector, the first controller of the first control module, and the first identification unit in the power supply module of the power output means correspond to a transmitter-side power supply module 11, a transmitter-side USB connector 12, a transmitter-side controller 13, and a transmitter-side indentation unit 14 in the charger 1, respectively. The second USB connector, the second controller of the second control module, and the second identification in the power input means 2 correspond to a receiver-side USB connector 21, a receiver-side controller 22, and a receiver-side identification unit 23 in the electric equipment 2, respectively.

The transmitter-side power supply module 11 is used as an energy source of the charger 1. The transmitter-side power supply module 11 may store electric energy itself, which can be used as an energy source of the charger 1 to provide the stored electric energy to the charger 1 for charging, thus the charger 1 may be a "ChargePal" brand storage device or the like which can store electric energy. The transmitter-side power supply module 11 may also be electrically coupled to the external power grid, and the power grid can be used as an energy source to provide electric energy to the charger 1, thus the charger 1 may be an adaptor for electric energy conversion.

The transmitter-side USB connector 12 is a USB output port which serves as a power output terminal of the charger 1. The transmitter-side USB connector 12 is electrically coupled to the transmitter-side power supply module 11 which is configured to output electric energy through the transmitter-side USB connector 12.

The transmitter-side controller 13 of the first control module is electrically coupled to the transmitter-side power supply module 11 and the transmitter-side USB connector 12, respectively. The transmitter-side controller 13 controls operating modes of the transmitter-side USB connector 12 when outputting electric energy, so that the transmitter-side USB connector 12 can operate in different modes and provide different voltages.

The transmitter-side identification unit 14 is disposed in the first control module of the charger 1 and can communicate with the receiver-side controller 22 of the second control module. The transmitter-side identification unit 14 is used for identifying power supply characteristics of the charger 1, and the power supply characteristics includes a maximum value of output voltage of the transmitter-side USB connector 12.

The receiver-side USB connector 21 is a USB input port, which can be electrically coupled to the transmitter-side USB connector 12, so that the electric energy is transferred from the charger 1 to the electric equipment 2 when they are electrically coupled to each other.

The receiver-side controller 22 of the second control module communicates with the transmitter-side controller 13, and the transmitter-side USB connector 12 is controlled according to the communication information. In this example, the communication between the receiver-side controller 22 and the transmitter-side controller 13 may be a wired communication, which is achieved by connection between the receiver-side USB connector 21 and the transmitter-side USB connector 12, or a wireless communication by radio, in view of actual requirements.

When the charger 1 does not have the transmitter-side identification unit 14, the electrical identification unit 23 can be disposed in the second control module of the electric equipment 2 to have the same function. Accordingly, the receiver-side identification unit 23 communicates with the transmitter-side controller 13 of the first control module. The receiver-side identification unit 23 is used for identifying power input characteristics of the electric equipment 2, and the power input characteristics includes a maximum value of input voltage of the receiver-side USB connector 21.

In this embodiment, the transmitter-side USB connector 12 at least provides an output voltage greater than or equal to 5V, and has two operating modes, including a precharging mode and an optimum charging mode. The transmitter-side USB connector 12 provides an output voltage constantly equal to 5V in the precharging mode and an output voltage greater than 5V in the optimum charging mode. The transmitter-side controller 13 controls the transmitter-side USB connector 12 to switch between the precharging mode and the optimum charging mode. The receiver-side controller 22 will not adjust the output voltage of the transmitter-side USB connector 12 and will have a constant output voltage when the transmitter-side USB connector 12 is in the precharging mode, and will adjust the output voltage of the transmitter-side USB connector 12 for high-power transfer of electric energy when the transmitter-side USB connector 12 is in the optimum charging mode.

During operation, the electric equipment 2 is electrically coupled to the charger 1 when the receiver-side USB connector 21 is electrically coupled to the transmitter-side USB connector 12. Firstly, the transmitter-side controller 13 controls the transmitter-side USB connector 12 to operate in the precharging mode, and the transmitter-side USB connector 12 provides a constant voltage equal to 5V to the electric equipment 2. The receiver-side controller 22 communicates with the transmitter-side controller 13 by electrical connection between the receiver-side USB connector 21 and the transmitter-side USB connector 12 after the electric equipment 2 receives a voltage, and obtains the power supply characteristics from the transmitter-side USB connector 12. That is, the receiver-side controller 22 obtains a maximum value of the output voltage of the transmitter-side USB connector 12, and determines whether the maximum value is below a maximum value of the input voltage of the receiver-side USB connector 21. In a case that the maximum value of the output voltage of the transmitter-side USB connector 12 is below a maximum value of the input voltage of the receiver-side USB connector 21, the transmitter-side controller 13 controls the transmitter-side USB connector 12, by communication therebetween, to switch to the optimum charging mode, and the receiver-side controller 22 controls the transmitter-side USB connector 12 to output a voltage greater than 5V to charge at high electric power. In a case that the maximum value of the output voltage of the transmitter-side USB connector 12 is not below a maximum value of the input voltage of the receiver-side USB connector 21, the transmitter-side USB connector 12 operates always in the precharging mode, and provides a content voltage equal to 5V.

The present disclosure also provides a power supply system which transfers electric energy at high electric power by a USB port. The structure of the power supply system will be described in detail hereinbelow.

A power supply system according to the present disclosure includes the electric tool 3 and the electric equipment 4, wherein the electric equipment 4 receives electric energy from the electric tool 3. The electric tool 3 includes a power supply module, a third USB connector, a third control module, and a third identification unit. The electric equipment 4 includes a fourth USB connector and a fourth control module. The third control module includes a third controller, and the fourth control module includes a fourth controller. It will be understood that the electric tool 3 may not have the third identification unit. Instead, the electric equipment 4 may have a fourth identification unit to have the same function.

Figure 2:
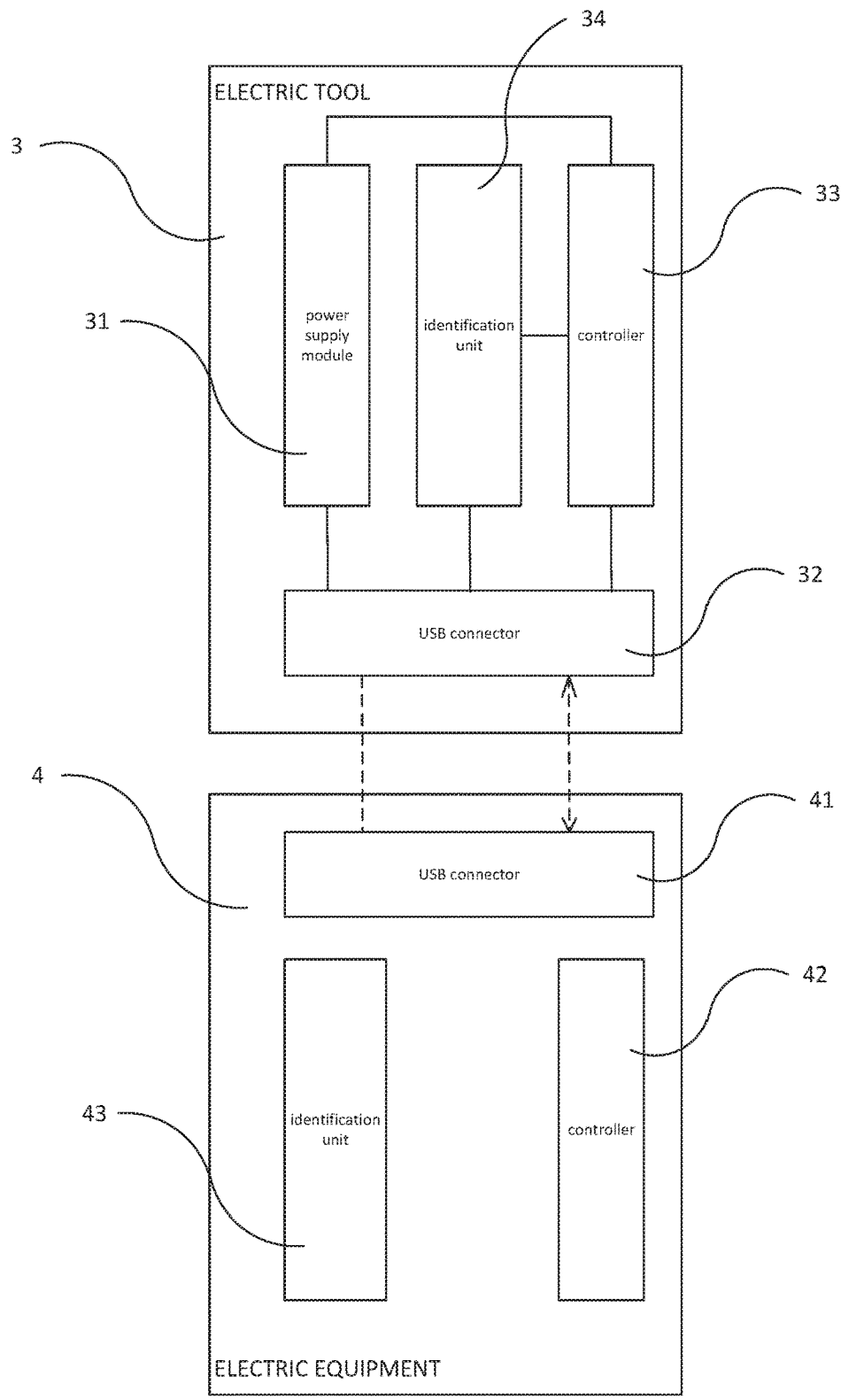
FIG. 2 is a block diagram of an example power supply system according to the description which follows.

FIG. 2 is a block diagram of an example power supply system. Referring to FIG. 2, the power supply module, the third USB connector, the third controller of the third control module, and the third identification unit in the electric tools 3 of the power supply system, correspond to a tool-side power supply module 31, a tool-side USB connector 32, a tool-side controller 33 and a tool-side identification unit 34 in FIG. 2, respectively. The fourth USB connector, the fourth controller of the fourth control module and the fourth identification unit in the electric equipment 4, correspond to an equipment-side USB connector 41, an equipment-side controller 42, and an equipment-side identification unit 43 in FIG. 2, respectively.

The tool-side power supply module 31 is used as an energy source of the electric tool 3. The tool-side power supply module 31 may store electric energy itself, which can be used as an energy source to provide the stored electric energy to the electric tool 3 during charging, so that the electric tool 3 may be a DC electric tool which can store electric energy. The tool-side power supply module 31 may also be electrically coupled to the external power grid, and the power grid can be used as an energy source to provide electric energy to the electric tool 3, so that the electric tool 3 may be an AC electric tool.

The tool-side USB connector 32 is a USB output port which serves as a power output terminal of the electric tool 3. The tool-side USB connector 32 is coupled to the tool-side power supply module 31 which is configured to provide electric energy through the tool-side USB connector 32.

The tool-side controller 33 of the third control module is electrically coupled to the tool-side power supply module 31 and the tool-side USB connector 32, respectively. The tool-side controller 33 controls operating modes of the tool-side USB connector 32 when outputting electric energy, so that the tool-side USB connector 32 can operate in different modes and provides different voltages.

The tool-side identification unit 34 is disposed in the third control module of the electric tool 3, and communicates with the equipment-side controller 42 of the fourth control module. The tool-side identification unit 34 is used for identifying power supply characteristics of the electric tool 3, and the power supply characteristics includes a maximum value of output voltage of the tool-side USB connector 32.

The equipment-side USB connector 41 is a USB input port, which can be electrically coupled to the tool-side USB connector 32, so that the electric energy is transferred from the electric tools 3 to the electric equipment 4 when they are electrically coupled to each other.

The equipment-side controller 42 of the fourth control module communicates with the tool-side controller 33, and the tool-side USB connector 32 is controlled according to the communication information. In this embodiment, communication between the equipment-side controller 42 and the tool-side controller 33 may be a wired communication, which is achieved by connection between the equipment-side USB connector 41 and the tool-side USB connector 32, or a wireless communication by radio, in view of actual requirements.

When the electric tool 3 does not have the tool-side identification unit 34, the equipment-side identification unit 43 can be disposed in the fourth control module of the electric equipment 4 to have the same function. Accordingly, the equipment-side identification unit 43 communicates with the tool-side controller 33 of the third control module. The equipment-side identification unit 43 is used for identifying power input characteristics of the electric equipment 4, and the power input characteristics includes a maximum value of input voltage of the equipment-side USB connector 41.

In this example, the tool-side USB connector 32 at least provides an output voltage greater than or equal to 5V, and has two operating modes, including a regular power supply mode and an optimum power supply mode. The tool-side USB connector 32 provides an output voltage constantly equal to 5V in the regular power supply mode and an output voltage greater than 5V in the optimum power supply mode. The tool-side controller 33 controls the tool-side USB connector 32 to switch between the regular power supply mode and the optimum power supply mode. The equipment-side controller 42 will not adjust the output voltage of the tool-side USB connector 32 and has a constant output voltage when the tool-side USB connector 32 is in regular power supply mode, and will adjust the output voltage of the tool-side USB connector 32 for high-power transfer of electric energy when the tool-side USB connector 32 is in the optimum power supply mode.

During operation, the electric equipment 4 is electrically coupled to the electric tool 3 when the equipment-side USB connector 41 is electrically coupled to the tool-side USB connector 32. Firstly, the equipment-side controller 33 controls the tool-side USB connector 32 to operate in the regular power supply mode, and the tool-side USB connector 32 provides a constant voltage equal to 5V to the electric equipment 4. The equipment-side controller 42 communicates with the tool-side controller by electrical connection between the equipment-side USB connector 41 and the tool-side USB connector 32 after the electric equipment 4 receives a voltage, and obtains the power supply characteristics from the tool-side USB connector 32. That is, the equipment-side controller 22 obtains a maximum value of the output voltage of the tool-side USB connector 32, and determines whether the maximum value is below a maximum value of the input voltage of the equipment-side USB connector 41. In a case that the maximum value of the output voltage of the tool-side USB connector 32 is below a maximum value of the input voltage of the equipment-side USB connector 41, the tool-side controller 33 controls the tool-side USB connector 32, by communication therebetween, to switch to the optimum power supply mode, and the equipment-side controller 42 controls the tool-side USB connector 32 to output a voltage greater than 5V to the tool at high electric power. In a case that the maximum value of the output voltage of the tool-side USB connector 32 is not below a maximum value of the input voltage of the equipment-side USB connector 41, the tool-side USB connector 32 operates always in the regular power supply mode, and provides a content voltage equal to 5V.

Figure 3:
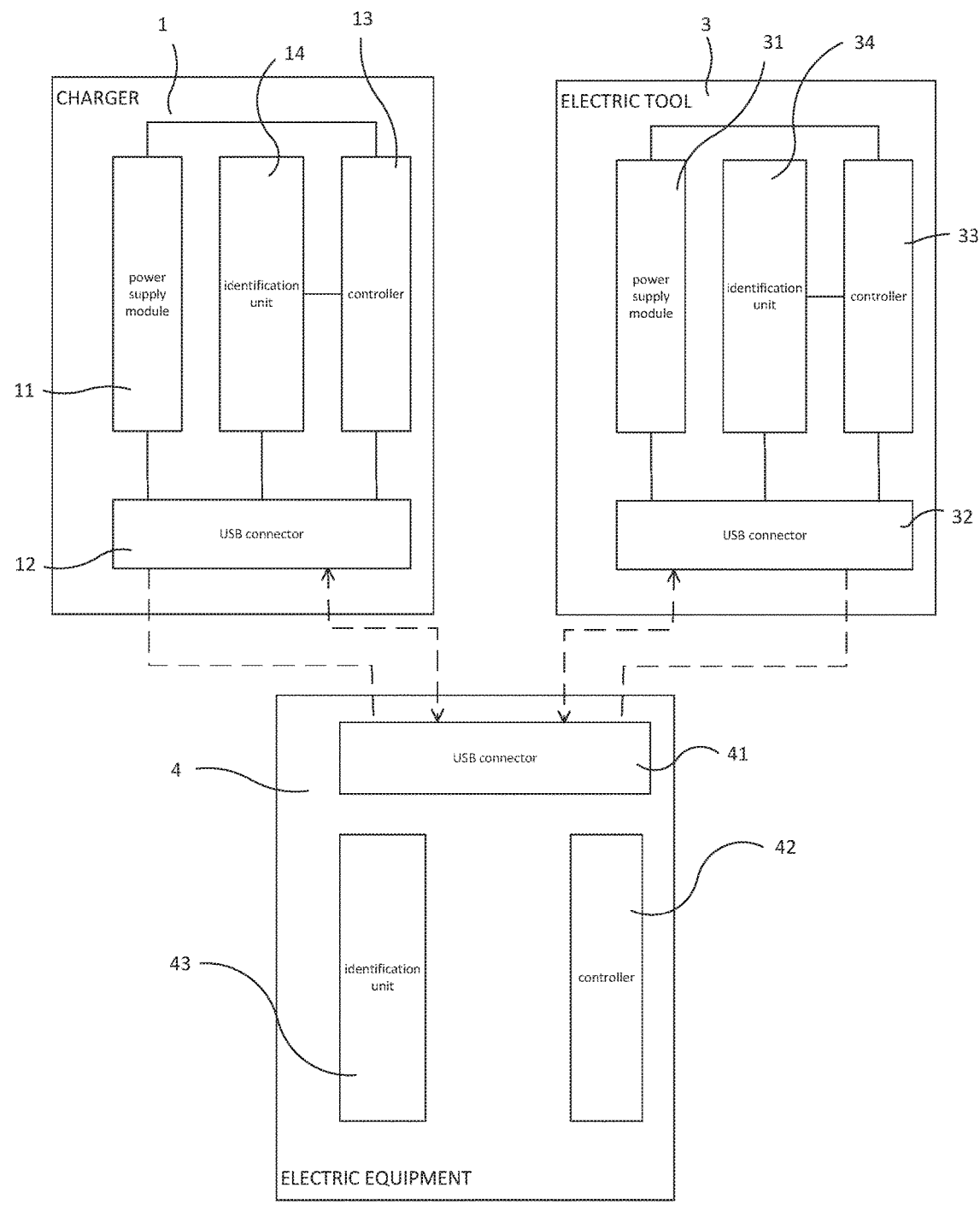
FIG. 3 is a block diagram of an example power transfer system according to the description which follows.

The present disclosure also provides a power transfer system. FIG. 3 is a block diagram of an example power transfer system. Referring to FIG. 3, the power transfer system includes the charging combination and the power supply system, as described above. For bi-directional charging, the electric equipment 4 of the power supply system may be the power input means of the charging combination which receives electric energy from the power output means. That is, the electric equipment 4 can be charged by the charger 1 or the electric tool 3 through the USB port.

The above embodiments show and describe the basic principle, main features, and advantages of the invention hereinafter claimed. It will be understood by the skilled in the art that the foregoing descriptions of specific embodiments of the present invention have been presented, but are not intended to limit the invention as claimed to the precise forms disclosed. Any modifications, equivalents, variations of the preferred embodiments can be made without departing from the doctrine and spirit of the present invention and such modifications, equivalents, and variations are intended to fall with the scope of the appended claims.

What is claimed is:

1. A power supply system, comprising an electric tool and an electric equipment which can receive electric energy from the electric tool,
    wherein the electric tool comprises:
        a power supply module configured to store electric energy or to obtain electric energy from an external power grid as an energy source of the electric tool;
        a first USB connector for being electrically coupled to the power supply module and at least configured to transfer electric energy; and
        a first control module comprising a first controller which is at least configured to control an output voltage of the first USB connector when supplying electric energy;
    wherein the electric equipment comprises:
        a second USB connector configured to be electrically coupled to the first USB connector for transferring electric energy; and
        a second control module comprising a second controller at least configured to communicate with the first control module and controlling the second USB connector; and
        the second USB connector provides an output voltage greater than or equal to 5V;
    wherein the first control module further comprises a first identification unit for indicating power supply characteristics of the electric tool, the power supply characteristics including at least a maximum output voltage of the first connector, and the first identification unit configured to at least communicate with the second control module,
    wherein the second control module further comprises a second identification unit for indicating power characteristics of the electric equipment, the power input characteristics of the electric equipment includes at least a maximum input voltage of the second USB connector, and the first controller is configured to at least communicate with the second control module, and
    wherein the first controller is electrically coupled to the power supply module and the first USB connector, respectively, the first USB connector has at least two power supply modes, including a precharging power supply mode in which the first USB connector provides an output voltage constantly equal to 5V and an optimum power supply mode in which the first connector provides an output voltage greater than 5V, the first controller controls the first USB connector to switch between the regular power supply mode and the optimum power supply mode, and the second controller controls an output voltage of the first USB connector in the optimum power supply mode by communicating with the first control module.

2. The power supply system according to claim 1, wherein the second controller communicates with the first controller via the first USB connector and the second USB connector.

* * * * *